US008341180B1

(12) United States Patent
Arumugam et al.

(10) Patent No.: US 8,341,180 B1
(45) Date of Patent: Dec. 25, 2012

(54) RISK ANALYSIS FOR DATA-INTENSIVE STOCHASTIC MODELS

(75) Inventors: Subramanian Arumugam, Gainesville, FL (US); Peter J. Haas, San Jose, CA (US); Ravindranath Chowdary Jampani, Gainesville, FL (US); Christopher Jermaine, Houston, TX (US); Luis L Perez, Houston, TX (US); Fei Xu, Bellevue, WA (US)

(73) Assignees: International Business Machines Corporation, Armonk, NY (US); Rice University, Houston, TX (US); University of Florida, Gainesville, FL (US)

( * ) Notice: Subject to any disclaimer, the term of this patent is extended or adjusted under 35 U.S.C. 154(b) by 0 days.

(21) Appl. No.: 13/231,792

(22) Filed: Sep. 13, 2011

(51) Int. Cl.
G06F 17/30 (2006.01)
(52) U.S. Cl. .................. 707/770; 707/610; 707/805
(58) Field of Classification Search .......... 707/610, 707/770, 805
See application file for complete search history.

(56) References Cited

U.S. PATENT DOCUMENTS

| | | | | |
|---|---|---|---|---|
| 6,671,679 B2* | 12/2003 | Griffin et al. | ............... | 705/30 |
| 7,139,676 B2* | 11/2006 | Barford | ............... | 702/183 |
| 7,805,443 B2* | 9/2010 | Konig et al. | ............... | 707/736 |
| 8,234,295 B2* | 7/2012 | Haas et al. | ............... | 707/769 |
| 2003/0172017 A1 | 9/2003 | Feingold et al. | | |
| 2003/0233197 A1 | 12/2003 | Padilla et al. | | |
| 2006/0085323 A1 | 4/2006 | Matty et al. | | |
| 2006/0085325 A1* | 4/2006 | Jammal et al. | ............... | 705/38 |
| 2006/0247990 A1 | 11/2006 | Narayanan et al. | | |
| 2010/0235300 A1 | 9/2010 | Feingold | | |
| 2010/0312775 A1 | 12/2010 | Haas et al. | | |
| 2011/0131076 A1 | 6/2011 | Leidner et al. | | |

OTHER PUBLICATIONS

Pandey "Quantile Estimation using Order Statistics and Minimum Cross-Entropy Principle" 8th ASCE Specialty Conference on Probabilistic, Mechanics and Structural Reliability, (2001), 6 pages.
Jampani et al. "MCDB: A Monte Carlo approach to managing uncertain data", SIGMOD (Jun. 2008), pp. 687-700.
Rubinstein "The Gibbs Cloner for Combinatorial Optimization, Counting and Sampling", Methodology and Computing in Applied Probability, vol. 11, No. 4, (Apr. 2008), 60 pages.
Cerou et al. "Rare event simulation for static distribution", Simulation, (Sep. 2009), 28 pages, available at http://www.irisa.fr/aspi/fcerou/Resim_Cerou_et_al.pdf.
Botev et al. "An Efficient Algoithm for Rare-event Probability, Estimation, Combinatorial Optmization, and Counting", Methodology and Computing in Applied Probability, vol. 10, issue 4, (Feb. 2003), 41 pages.
Arumugam et al. "MCDB-R: Risk Analysis in the Database" Proceedings of the VLDB Endowment, vol. 3, Issue 1-2. (Sep. 2010), 12 pages.

* cited by examiner

*Primary Examiner* — Cheryl Lewis
(74) *Attorney, Agent, or Firm* — Jeffrey T. Holman

(57) ABSTRACT

A risk analysis system and method are provided. The system includes an analyzer for analyzing database instances by executing a query on each database instance and selecting a cutoff value. The analyzer also discards the sets of uncertainty data that yield query-result values below the cutoff value and retains the database instances that yield query-result values above the cutoff value as elite sets. The system also includes a cloner to replicate the elite sets, and a sampler to modify the elite sets so that each elite set is mutually statistically independent while still yielding query-result values above the cutoff value.

18 Claims, 7 Drawing Sheets

RISK ANALYSIS FOR DATA-INTENSIVE STOCHASTIC MODELS

BACKGROUND

In the face of regulatory processes such as Basel III and Solvency 2, enterprises are becoming increasingly concerned with managing and assessing the credit, financial, engineering, and operational risk arising from uncertain data. Examples of uncertain data include future values of financial assets, customer order quantities under hypothetical price changes, and transportation times for future shipments under alternative shipping schemes.

Such uncertainty is typically modeled as a probability distribution over the uncertain data values, specified by means of a complex (often predictive) stochastic model. The probability distribution over data values leads to a probability distribution over database query results, and risk assessment amounts to exploration of the upper or lower tail of a query-result distribution.

Monte Carlo Database approaches have been proposed to permit Monte Carlo analysis of query-result distributions arising from complex data intensive stochastic models, but such systems cannot estimate extreme quantiles of such distributions nor permit estimation of properties of the distribution tails defined by such quantiles. The difficulty is that too many Monte Carlo replications are needed in order to observe extreme values of query answers.

SUMMARY

A system for estimating an extreme upper quantile of a probability distribution of a query result over uncertain data ("the query-result distribution") in a database, as well as generating samples ("tail samples") from the portion of the distribution lying above the extreme upper quantile (the extreme "upper tail" of the distribution) is described. The system includes an analyzer configured to analyze a plurality of database instances that yield query results forming samples from a query-result distribution having an extreme quantile of interest. The analyzer also discards the database instances that yield query-result values below a cutoff value and retains as an "elite" set those "elite" database instances yielding query-result values above the cutoff value. The analyzer also repeatedly increases the cutoff value until it coincides with the extreme quantile of interest, at which point the query results over the set of elite database instances form a set of independent and identically distributed samples from the extreme upper tail demarcated by the extreme quantile of interest. The system also includes a cloner to replicate a plurality of the instances in an elite set, and a sampler to modify the instances in elite sets so that the instances are mutually statistically independent while still yielding query-result values above the current cutoff value. Embodiments of a method are also described.

Other aspects and advantages of embodiments of the present disclosure will become apparent from the following detailed description, taken in conjunction with the accompanying drawings, illustrated by way of example of the principles of the disclosure.

BRIEF DESCRIPTION OF THE DRAWINGS

Throughout the description, similar reference numbers may be used to identify similar elements.

DETAILED DESCRIPTION

Figure 1:
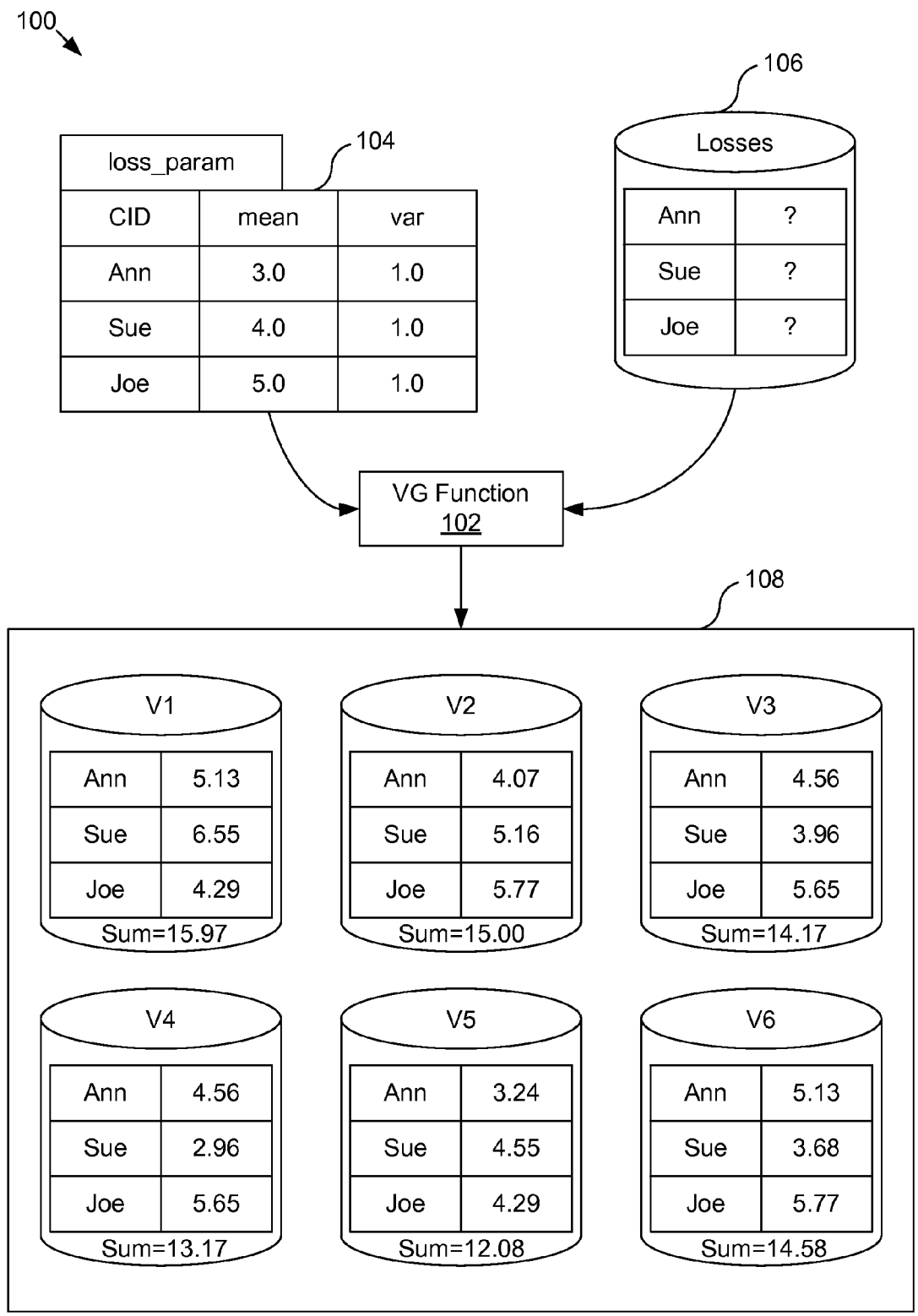
FIG. 1 is a schematic block diagram depicting a Monte Carlo Database system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Thus, discussions of the features and advantages, and similar language, throughout this specification may, but do not necessarily, refer to the same embodiment.

Furthermore, the described features, advantages, and characteristics of the disclosure may be combined in any suitable manner in one or more embodiments. One skilled in the relevant art will recognize, in light of the description herein, that the disclosure can be practiced without one or more of the specific features or advantages of a particular embodiment. In other instances, additional features and advantages may be recognized in certain embodiments that may not be present in all embodiments of the disclosure.

Reference throughout this specification to "one embodiment," "an embodiment," or similar language means that a particular feature, structure, or characteristic described in connection with the indicated embodiment is included in at least one embodiment of the present disclosure. Thus, the phrases "in one embodiment," "in an embodiment," and similar language throughout this specification may, but do not necessarily, all refer to the same embodiment.

While many embodiments are described herein, at least some of the described embodiments implement a system for handling data uncertainty using a Monte Carlo Database ("MCDB") system. The system includes an analyzer configured to analyze a plurality of database instances that yield query results forming samples from a query-result distribution having an extreme upper quantile of interest. The analyzer also discards the database instances that yield query-result values below a cutoff value and retains the set of database instances as an elite set whose elements yield query-result values above the cutoff value. The analyzer also repeatedly increases the cutoff value until the cutoff coincides with the extreme quantile of interest, at which point the query results over the set of elite database instances form a set of independent and identically distributed samples from the extreme upper tail of the query-result distribution demarcated by the extreme quantile of interest. The system also includes a cloner to replicate a plurality of database instances in the current elite set, and a sampler to perturb the instances in the current elite set so that instances in the elite set are mutually statistically independent while still yielding query-result values above the current cutoff value.

While the system is described with respect to estimating extreme upper quantiles and obtaining samples from extreme upper tails of a query-result distribution (called "tail samples"), it is to be understood that trivial changes to the embodiment, well known to those skilled in the art, permit estimation of extreme lower quantiles and sampling from the extreme lower tails of a query-result distribution.

FIG. 1 is a schematic block diagram depicting a Monte Carlo Database system 100. The MCDB system 100 allows a user to define arbitrary variable generation (VG) functions 102 that embody the database uncertainty by embodying the probability distributions over each of the uncertain values. The probability distributions over individual uncertain values gives rise to an overall probability distribution over possible realizations of the entire database; this latter distribution is called the "possible-worlds" distribution. The MCDB system 100 uses the VG functions to pseudorandomly generate realized values for all of the uncertain attributes, and hence to generate samples from the possible-worlds distribution, thereby creating a large number of independent and identically distributed realizations of the random database—also known as "possible worlds" or "database instances" 108—on the fly, and allow the running of a query of interest over each of them. Using the database instances 108, the MCDB system 100 summarizes the effect of the underlying uncertainty in the form of an empirical probability distribution over the possible query results.

For example, suppose a corporation wishes to ask "what would our revenue have been the last 12 months if we had raised all of our prices by 5%?" The attributes here are uncertain because the company did not raise their prices by 5%, so the relevant data is not present. Using the MCDB system 100, a user can specify a VG function 102 that, for a given customer, performs a Bayesian inference step to determine a demand distribution for the customer at the new price, and then pseudorandomly generate a specific order quantity according to this distribution.

The VG function 102 receives as input customer data 104, 106 and generates multiple database instances 108, that is, possible worlds. In one example, the number of possible worlds numbers in the thousands or more. The specific implementation of the VG function 102 is described in detail in United States Patent Application Publication # US2010/0312775, U.S. Pat. No. 8,234,295 which is incorporated herein by reference. The user can then, for example, run a query on each database instance that multiplies the order quantity for each customer by the unit price and sums these numbers up over all customers to compute total annual revenue. The empirical distribution of the total annual revenue numbers over the database instances is then an approximation of the true query-result distribution.

Figure 2:
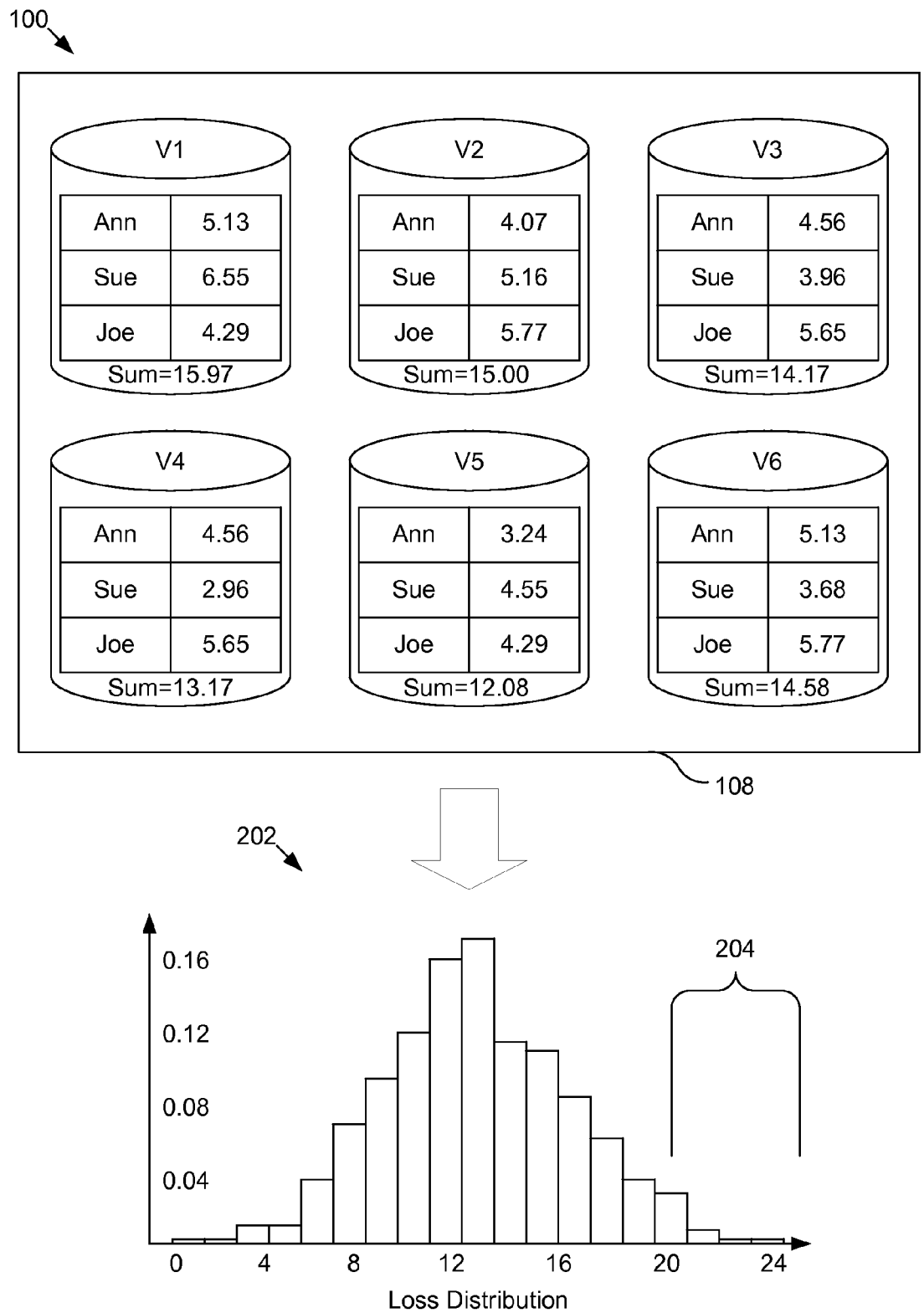
FIG. 2 is a schematic block diagram illustrating another embodiment of the MCDB system.

FIG. 2 is a schematic block diagram illustrating another embodiment of the MCDB system 100. Enterprises often need to assess and manage risk arising from uncertainty in their data. The MCDB system 100 allows for the modeling of risk as an extreme quantile of a query-result distribution, where the query of interest typically computes the "loss" corresponding to the data in the database. This distribution is approximated in MCDB by the empirical query-result distribution 202 that is computed by evaluating the query over each of the possible worlds 108 generated as described above with reference to FIG. 1.

Risk assessment often corresponds to computing interesting properties of upper tails 204 of the empirical probability distribution 202, for example, computing an extreme value $\gamma$ where there is a 0.1% probability of seeing a loss of $\gamma$ or more. Such a value is called the upper 0.1% quantile of the loss distribution or, in financial applications, the "0.1% value at risk", and the portion of the loss distribution lying above $\gamma$ is called the 0.1% upper tail of the loss distribution. The value at risk represents a (probabilistic) worst-case scenario for the amount of money, materials, time, etc., that might be lost.

Besides identification of this extreme upper tail, risk assessment also requires generating samples from the loss distribution that lie in the upper tail, in order to estimate, for example, the expected loss, given that the loss is extreme. The difficulty is that millions of Monte Carlo repetitions may be required to observe even one extreme simulated loss. For example, if (unknown to the analyst) the true loss distribution is Gaussian, with a mean of $10 million and a standard deviation of $1 million, roughly 3.5 million repetitions are required to see a single loss exceeding $15 million.

Figure 3:
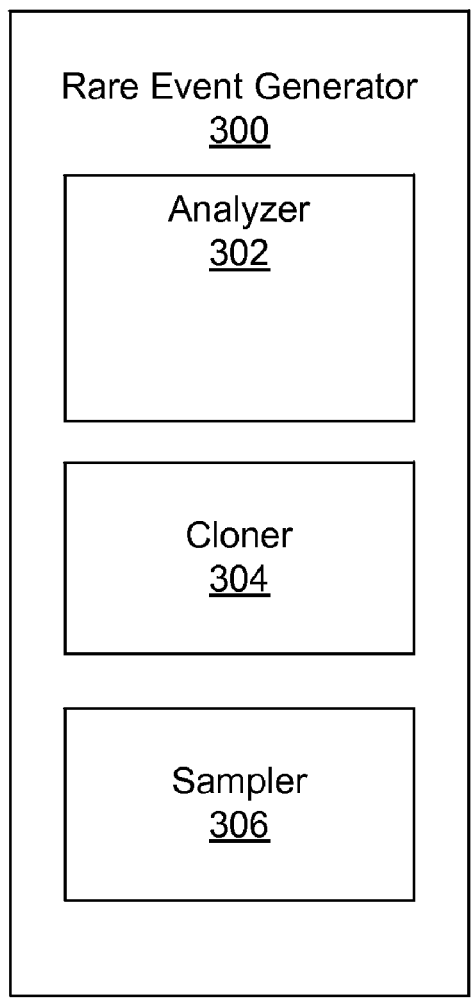
FIG. 3 is a schematic block diagram illustrating one embodiment of a rare event generator.

FIG. 3 is a schematic block diagram illustrating one embodiment of a rare event generator (REG) 300. The REG 300 is configured to efficiently generate the rare situations that occur in the tail area 204 of the probability distribution 202. The REG 300 efficiently locates the extreme upper tail 204 by computing the value of $\gamma$ corresponding to a user-specified, very small loss probability (0.1% in the foregoing example). The REG also generates independent samples from this tail, that is, generates database instances such that the result of the loss query on each of these instances lies in the extreme upper tail. The REG 300 includes an analyzer 302, a cloner 304, and a sampler 306.

The analyzer 302 is configured to analyze the database instances 108 and retain instances yielding query results that lie above a cutoff value while discarding instances that result in query results that lie below the cutoff values. The term "cutoff fraction" refers to the fraction of database instances that are discarded. The cutoff value is repeatedly raised over a number of steps until the area above the cutoff value coincides with the target area (0.1% in the previous example) of the extreme upper tail 204, and hence the cutoff itself corresponds to the extreme quantile of interest. A set of database instances 108 yielding query results that lie above the current cutoff are referred to as the current "elite set." In one example, at each step, the cutoff is increased so that half of the current elite set is discarded, so that the successive cutoff values correspond to the 50% quantile of the query-result distribution (which retains the upper 50% of the database instances), the 75% quantile (retaining the upper 50% of the upper 50%), the 87.5% quantile (retaining the upper 50% of the upper 50% of the upper 50%), and so on. Thus the analyzer produces a sequence of elite sets corresponding to higher and higher values of the cutoff value, until the cutoff value coincides with the extreme quantile of interest and the elite set corresponds to a set of samples from the extreme upper tail.

The cloner 304 is configured to enlarge the current elite set to form a new elite set by replicating a plurality of the database instances in the elite set. The goal is to compensate for the non-elite instances that have most recently been discarded by the analyzer. In one example, the analyzer discards 50% of the instances at each step (a 50% cutoff fraction), so the cloner generates an identical copy of each database instance that remains, in order to keep the size of the elite set constant from step to step.

The sampler 306 is configured to perturb the database instances in the elite sets so that they become mutually statistically independent while still yielding query results that lie above the cutoff value. In other words, the resulting instances are still elite. In one embodiment, the sampler 306 is configured to iteratively analyze each data element in a database instance and, for each element analyzed, replace the data element with a new "trial" element generated according to the appropriate VG function. If, after this replacement, the modified database instance is still elite (that is, yields a query result that lies above the current cutoff), then the trial element replaces the original data element; otherwise, the sampler tries again by generating another trial element. This process is repeated until a trial element succeeds in replacing the original data element, and then the sampler moves on to analyze the next data element in the database instance. One skilled in the art will understand that the query evaluations used in the perturbation process need not always be run from scratch; it may suffice to execute the query over a database instance only once, and then efficiently compute the changes in the query result when a data element is replaced by a trial element.

Figure 4:
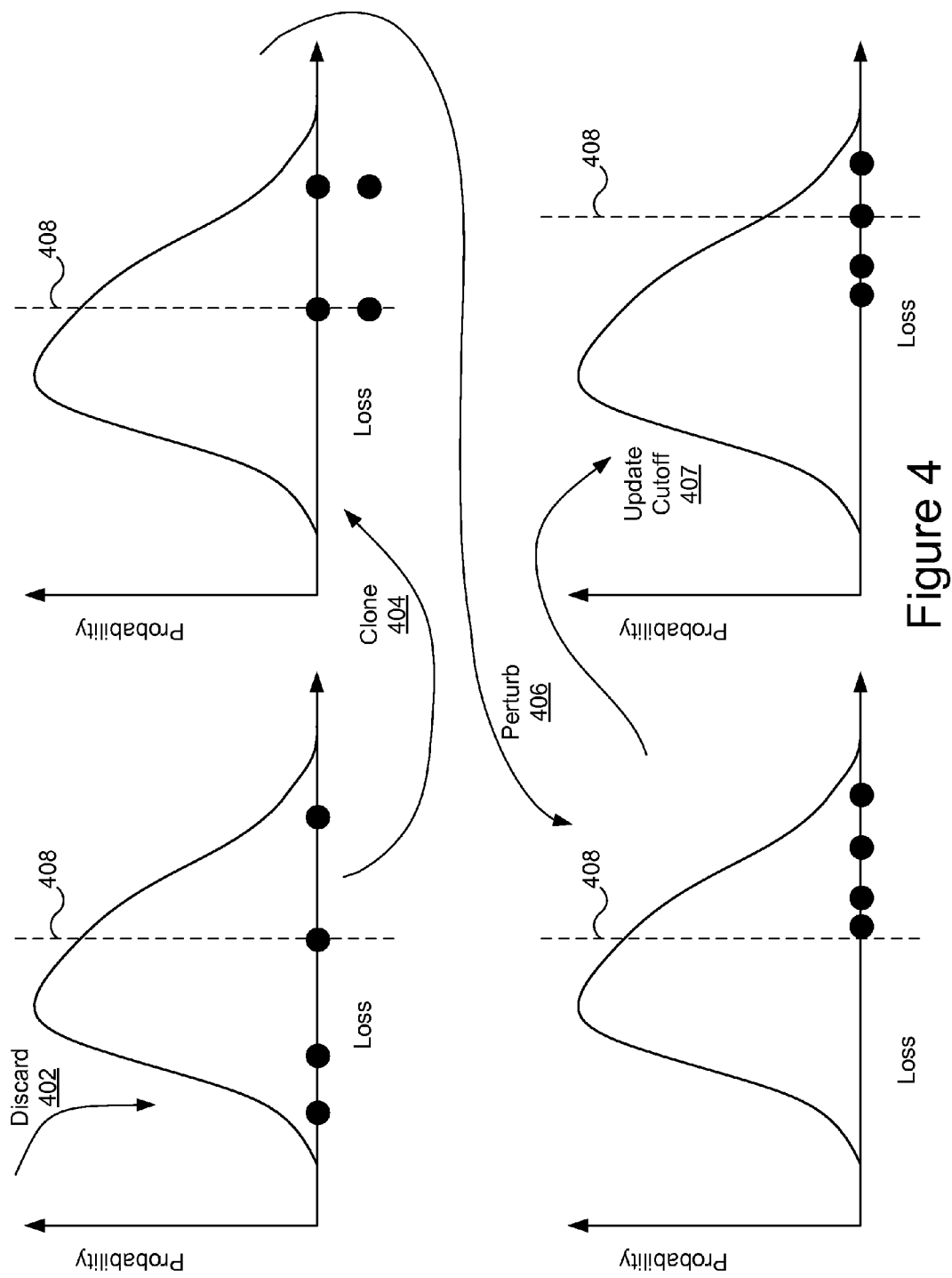
FIG. 4 is a schematic block diagram graphically illustrating the steps of discarding, cloning, and perturbing.

FIG. 4 is a schematic block diagram graphically illustrating the steps of discarding, cloning, and perturbing. The REG 300 is configured to "walk out" to the tail 204 by repeatedly causing the analyzer 302, cloner 304, and sampler 306 to, respectively, discard 402, clone 404, and perturb 406 the database instances 108. For example, utilizing the data of FIG. 1, the REG 300 is configured to analyze the three customers Ann, Sue, and Joe, each of whose individual (uncertain) losses is modeled by a Gaussian distribution. The corresponding means and variances of the Gaussians that are used by the VG function that generates loss instances are depicted in table 104. For example, a user desires to analyze the top 3.125% of the total-loss distribution. After the VG function 102 has generated the initial six database instances 108, the REG 300 runs a query on each instance. The query, in one example, is simply to sum the values for Ann, Sue, and Joe. The REG 300 determines an initial cutoff value 408 which may be predetermined by the user or by the system. For instance, initial cutoff value may be the median, or $50^{th}$ percentile of all sums, so that the cutoff value is 14.58 (the third largest sum value).

The analyzer 302 discards the database instances that, when summed, fall below the cutoff value 408. The analyzer 302 retains the elite database instances that, when summed, are above the cutoff value 408. The cloner 304 replicates the elite database instances to enlarge size of the elite set of database instances.

The elite instances are now not mutually independent (since some instances are exact copies of other instances), so the sampler 306 then perturbs 406 each of the elite instances to make them independent while remaining elite. Or in other words, the query-result values after being perturbed are greater than the cutoff value 408.

Following the example of FIG. 1, the sampler 306 starts with V1 and begins the perturbation by attempting to replace the value 5.13 that corresponds to Ann's loss. The sampler 306 may generate a Gaussian sample with mean 3.0 and variance 1.0 as in table 104. The random value, as described above, is a result of the VG function 102. If the random value is greater than 5.13, the sum will also be greater than the cutoff value 408, and the sampler 306 will continue to the next element in instance V1, namely, the value for Sue. After the sampler has perturbed all six database instances, the REG 300 again repeats the query, and updates 407 the cutoff value 408 to the median of the sums for the six perturbed instances. The REG 300 "walks" or "bootstraps" the cutoff value 408 from, for example, the $50^{th}$ percentile to a selected percentile that represents a desired "rare event" probability. In the example, the final percentile would be the 99.6857% percentile, which corresponds to the target upper tail probability of 100%–99.6875%=3.125%. In the described example, this "rare event" probability may be referred to as the "value at risk." If the cutoff fraction is 50% at each bootstrapping step, then five steps are required to reach the target.

Figure 5:
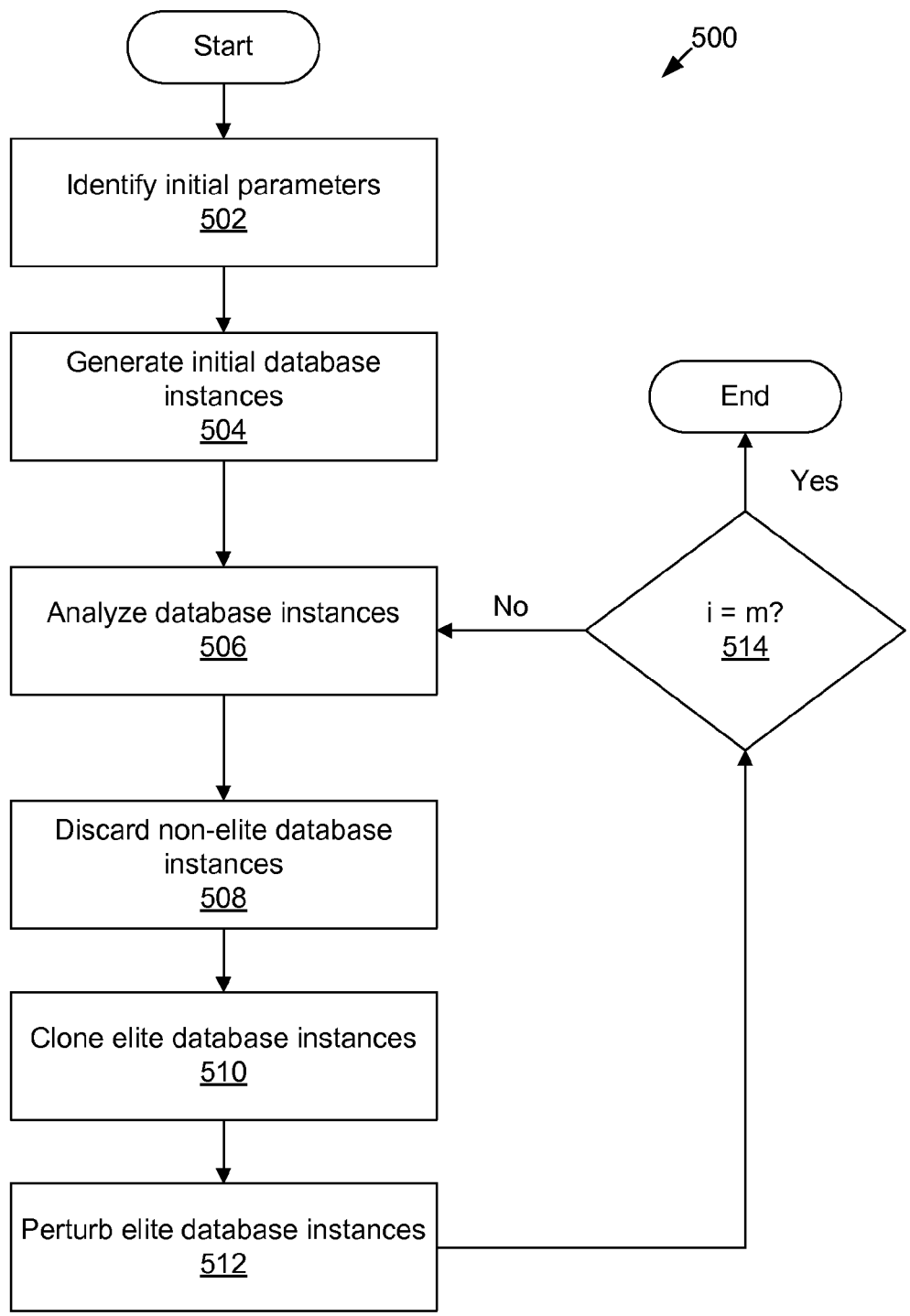
FIG. 5 is a schematic block diagram illustrating one embodiment of a method for analyzing the tail of a probability distribution

FIG. 5 is a schematic block diagram illustrating one embodiment of a method 500 for analyzing the tail of a probability distribution. The method starts and the REG 300 identifies 502 initial parameters. In one embodiment, identifying initial parameters includes analyzing a database to determine a probability distribution and subsequently identifying an upper-tail probability target, number of perturbing/sampling steps, number of walking/bootstrapping steps, sequence of cutoff fractions, and sequence of sample sizes. In an alternative embodiment, the initial parameters are predetermined by a user and the REG 300 identifies these predetermined initial parameters.

The VG function 102 then generates 504 the initial database instances 108. The VG function 102 may utilize stochastic models to pseudorandomly generate instances of uncertain data values in database instances that ultimately yield an empirical query-result distribution, as described above with reference to FIG. 2.

The REG 300 than analyzes 506 the instances. In one embodiment, analyzing 506 includes analyzing database instances and running a query on the instances. In one example, running a query may simply sum the values in a database instance. One skilled in the art will realize that any number of different simple or complicated database queries may be used, however, for clarity, the example given here is simply the summing of the values in the database. The REG 300 then identifies an initial cutoff value.

The analyzer 302 then discards 508 non-elite database instances. The non-elite instances are those sets that yield query results that fall below the cutoff value. The cloner 304 then clones 510 the elite sets.

The sampler 512, as will be described below in greater detail with reference to FIG. 6, perturbs 512 the elite instances. The method 500 iteratively continues if 514 the number of iterations i of discarding 508, cloning 510, and perturbing 512 does not equal the desired number m of walking/bootstrapping steps.

In another embodiment, method 500, instead of being graphically depicted as a block diagram, may be represented by the following pseudo-code:

1. Inputs:
2.    p: target upper-tail probability
3.    l: desired number of tail samples
4. Outputs:
5.    γ: estimate of (1-p)-quantile

```
 6.    S: set of l tail samples from VG function
 7. Parameters
 8.    k: number of perturbing steps
 9.    m: number of walk/bootstrap steps
10.    n₁, n₂, ..., nₘ: intermediate sample sizes
11.    p₁, p₂, ..., pₘ: intermediate tail probabilities
12.
13. //Initialize
14. Generate databases instances V₁, V₂, ...Vₓ according to VG function
15. S ← { V₁, V₂, ..., Vₓ}
16. n_{m+1} ← 1
17. //Execute m bootstrapping steps
18. for i ← 1 to m do
19.    γᵢ ← the (pᵢ|S|)-largest element of {Q (D) : D ∈ S }
20.    Discard all elements D ∈ S with Q(D) < γᵢ
21.    S ← Clone ( S, n_{i+1} )
22.    for D ∈ S do
23.        D ← Perturb (D , k , γᵢ )
24.    end for
25. end for
26. return γ=γₘ and S
```

In one embodiment, the sample sizes $n_i$ are all equal, as are the intermediate tail probabilities $p_i$. The ith "intermediate tail probability" is equal to 1 minus the ith cutoff fraction, and the ith "intermediate sample size" refers to the number of elite instances maintained at the ith step. In general, the sequence intermediate sample sizes and tail probabilities may be chosen based on the target extreme quantile, desired computational costs, and desired accuracy of the computed extreme quantile.

Figure 6:
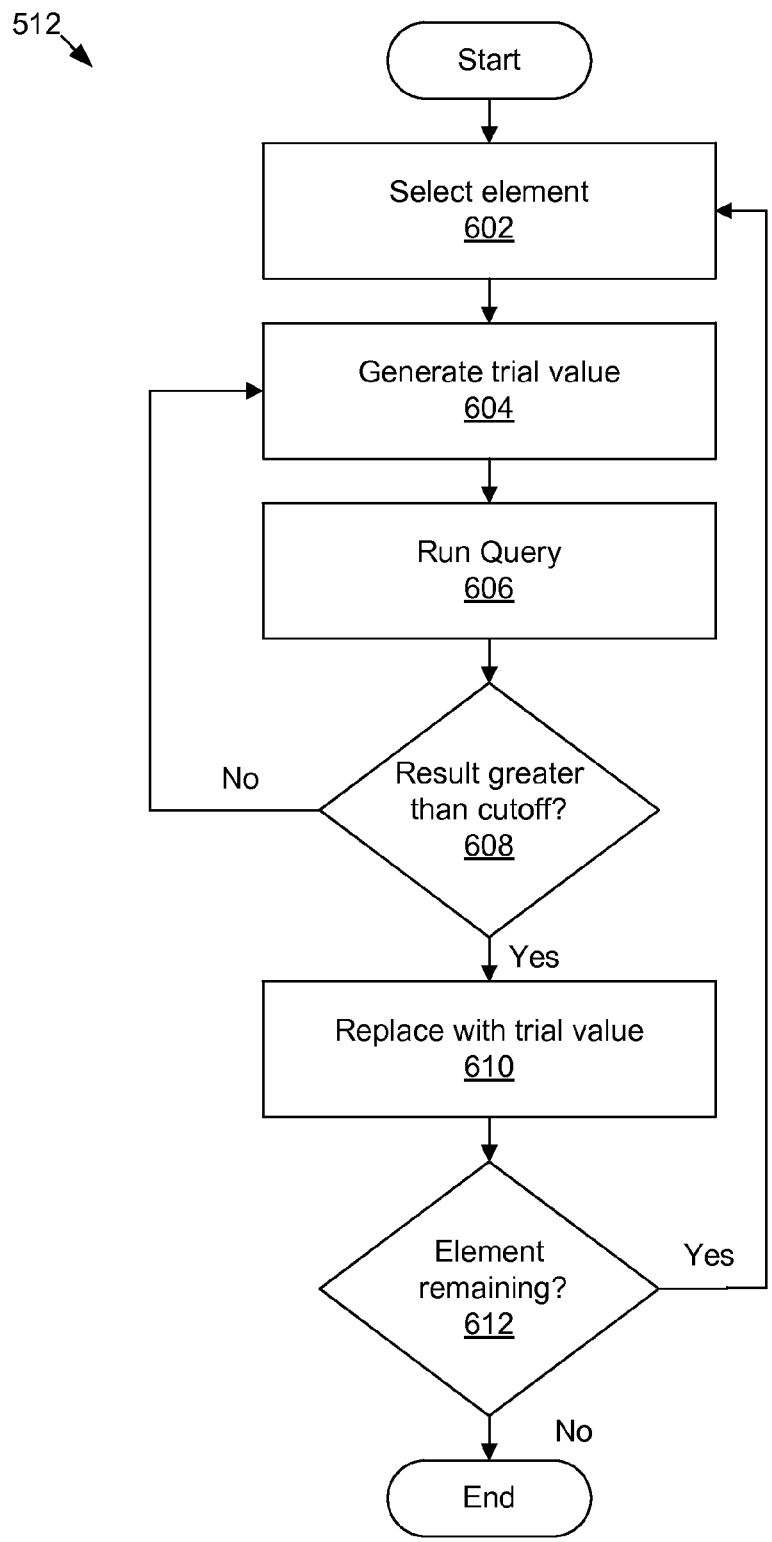
FIG. 6 is a schematic block diagram illustrating one embodiment of a method for perturbing elements of a database.

FIG. 6 is a schematic block diagram illustrating one embodiment of a method 512 for perturbing elements of a database instance. The method 512 starts and the sampler 306 selects 602 an element from the instance. Selecting 602 an element may include selecting a record from a database. The sampler 306 then generates 604 a trial value using a VG function as in FIG. 1. In one embodiment, generating 604 a trial value includes selecting a value from a previously generated list of trial values as described above with respect to the VG function of FIG. 1. Alternatively, the sampler 306 may generate a trial value on the fly. The REG 300 then runs 606 a query on the database, with the trial value replacing the element, to determine if the query is 608 greater than the cutoff value. If the answer is yes, the sampler replaces 610 the original element with the trial value. If the answer is no, the sampler 306 generates 604 another trial value. The sampler 306 continues these steps until no elements remain 612.

In another embodiment, method 512, instead of being graphically depicted as a block diagram, may be represented by the following pseudo-code:

```
 1. Inputs:
 2.    X⁽⁰⁾ : initial random element of Xʳ
 3.    k: number of perturbing steps
 4. Output:
 5.    X⁽ᵏ⁾ : updated value of X⁽⁰⁾
 6.
 7. Perturb ( X⁽⁰⁾ , k ):
 8. x ← X⁽⁰⁾
 9. for j ← 1 to k do
10.    //Perform one systematic updating step: X⁽ʲ⁻¹⁾ → X⁽ʲ⁾
11.    for ← 1 to r do
12.        repeat
13.            Generate u according to VG function
14.        until Query ( u instead of xᵢ ) ≧cutoff value
15.        return u
16.        xᵢ ← u
17.    end for
18. end for
19. Return x
```

Perturbing 512, in one embodiment, generates samples from the high-dimensional probability distribution function for database instances, conditioned on the instance being elite; call this the conditional instance distribution function, or CIDF. Since each new sample is generated recursively from the previous sample, the sequence forms a type of Markov chain. If the initial sample $X^{(0)}$ is generated from the CIDF, then the chain will be "stationary" in that every subsequent sample will be distributed according to the CIDF. Although the samples are not statistically independent, under mild regularity conditions the random vectors $X^{(0)}$ and $X^{(k)}$ become increasingly independent as k increases. This convergence to independence is usually exponentially fast, so that k need not be very large. In one embodiment, the value of k is in the range of between about 1 and 5. In a further embodiment, the value of k is 1.

Figure 7:
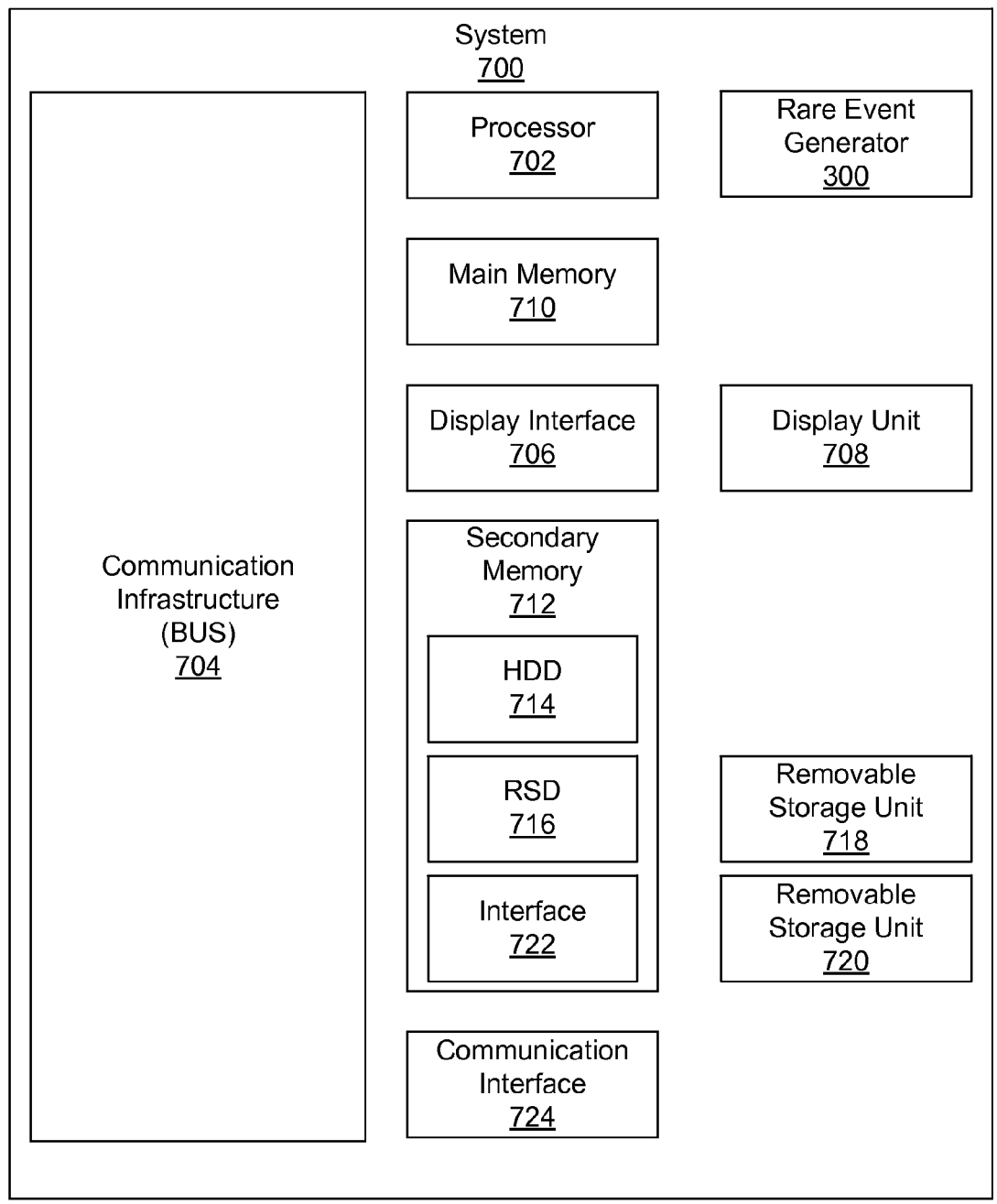
FIG. 7 is a high level block diagram showing an information processing system.

FIG. 7 is a high level block diagram showing an information processing system 700. The system 700 includes one or more processors, such as processor 702. The processor 702 is connected to a communication infrastructure 704 (e.g., a communications bus, cross-over bar, or network). Various software embodiments are described in terms of this exemplary computer system. After reading this description, it will become apparent to a person of ordinary skill in the relevant art(s) how to implement the disclosure using other computer systems and/or computer architectures.

The computer system can include a display interface 706 that forwards graphics, text, and other data from the communication infrastructure 704 (or from a frame buffer not shown) for display on a display unit 708. The computer system also includes a main memory 710, preferably random access memory (RAM), and may also include a secondary memory 712. The secondary memory 712 may include, for example, a hard disk drive 714 and/or a removable storage drive 716, representing, for example, a floppy disk drive, a magnetic tape drive, or an optical disk drive. The removable storage drive 716 reads from and/or writes to a removable storage unit 718 in a manner well known to those having ordinary skill in the art. Removable storage unit 718 represents, for example, a floppy disk, a compact disc, a magnetic tape, or an optical disk, etc. which is read by and written to by removable storage drive 716. As will be appreciated, the removable storage unit 718 includes a computer readable medium having stored therein computer software and/or data.

In alternative embodiments, the secondary memory 712 may include other similar means for allowing computer programs or other instructions to be loaded into the computer system. Such means may include, for example, a removable storage unit 720 and an interface 722. Examples of such means may include a program cartridge and cartridge interface (such as that found in video game devices), a removable memory chip (such as an EPROM, or PROM) and associated socket, and other removable storage units 720 and interfaces 722 which allow software and data to be transferred from the removable storage unit 720 to the computer system.

The computer system may also include a communications interface 724. Communications interface 724 allows software and data to be transferred between the computer system and external devices. Examples of communications interface 724 may include a modem, a network interface (such as an Ethernet card), a communications port, or a PCMCIA slot and card, etc. Software and data transferred via communications interface 724 are in the form of signals which may be, for example, electronic, electromagnetic, optical, or other signals capable of being received by communications interface 724. These signals are provided to communications interface 724 via a communications path (i.e., channel). This communications path carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as main memory 710 and secondary memory 712, removable storage drive 716, and a hard disk installed in hard disk drive 714.

Computer programs (also called computer control logic) are stored in main memory 710 and/or secondary memory 712. Computer programs may also be received via communications interface 724. Such computer programs, when executed, enable the computer system to perform the features of the present disclosure as discussed herein. In particular, the computer programs, when executed, enable the processor 702 to perform the features of the REG 300. Accordingly, such computer programs represent controllers of the computer system.

In the above description, specific details of various embodiments are provided. However, some embodiments may be practiced with less than all of these specific details. In other instances, certain methods, procedures, components, structures, and/or functions are described in no more detail than to enable the various embodiments of the disclosure, for the sake of brevity and clarity.

Although specific embodiments of the disclosure have been described and illustrated, the disclosure is not to be limited to the specific forms or arrangements of parts so described and illustrated. The scope of the disclosure is to be defined by the claims appended hereto and their equivalents.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to monitor a pointer movement in a web page. The web page displays one or more content feeds. In one embodiment, operations to report the pointer movement in response to the pointer movement comprising an interaction gesture are included in the computer program product. In a further embodiment, operations are included in the computer program product for tabulating a quantity of one or more types of interaction with one or more content feeds displayed by the web page.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the disclosure can take the form of an entirely hardware embodiment, an entirely software embodiment, or an embodiment containing both hardware and software elements. In one embodiment, the disclosure is implemented in software, which includes but is not limited to firmware, resident software, microcode, etc.

Furthermore, embodiments of the disclosure can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A computer program product comprising:
   a computer readable storage medium to store a computer readable program, wherein the computer readable program, when executed by a processor within a computer, causes the computer to perform operations for designating a graphical element displayed in a user interface, the operations comprising:
      generating a plurality of database instances from a possible-worlds database according to a plurality of Monte Carlo variable generation functions;
      analyzing the database instances from the possible-worlds database by executing a query on each database instance to generate a query-result distribution having an extreme upper quantile of interest;
      selecting a cutoff value; and
   discarding the database instances that yield query-result values below the cutoff value, and retaining the database instances that yield query-result values above the cutoff value as elite sets.

2. The computer program product of claim 1, wherein the operations further comprise cloning the elite sets.

3. The computer program product of claim 2, wherein the operations further comprise modifying the elite sets so that each elite set is mutually statistically independent while still yielding query-result values above the cutoff value.

4. The computer program product of claim 3, wherein modifying the elite sets further comprises:
   selecting an element from one of the elite sets;
   generating a trial element to replace the element;
   analyzing the elite set to determine if the query-result value is greater than the cutoff value; and
   replacing the element with the trial value if the query-result value exceeds the cutoff value.

5. The computer program product of claim 1, wherein the operations further comprise updating the cutoff value after each iteration of analyzing and discarding until the cutoff value coincides with a predefined extreme upper quantile.

6. The computer program product of claim 5, wherein all intermediate tail probabilities are equal and all intermediate sample sizes are equal.

7. A method comprising:
- generating a plurality of database instances from a possible-worlds database according to a plurality of Monte Carlo variable generation functions;
- analyzing the database instances from the possible-worlds database by executing a query on each database instance to generate a query-result distribution having an extreme upper quantile of interest;
- selecting a cutoff value; and
- discarding the database instances that yield query-result values below the cutoff value, and retaining the database instances that yield query-result values above the cutoff value as elite sets.

8. The method of claim 7, further comprising cloning the elite sets.

9. The method of claim 8, further comprising modifying the elite sets so that each elite set is mutually statistically independent while still yielding query-result values above the cutoff value.

10. The method of claim 9, wherein modifying the elite sets further comprises:
- selecting an element from one of the elite sets;
- generating a trial element to replace the element;
- analyzing the elite set to determine if the query-result value is greater than the cutoff value; and
- replacing the element with the trial element if the query-result value is greater than.

11. The method of claim 7, further comprising updating the cutoff value after each iteration of analyzing and discarding until the cutoff value coincides with a predefined extreme upper quantile.

12. The method of claim 11, wherein the cutoff value is equal to a 50% quantile of query-result values of the elite sets.

13. A system comprising:
- a Monte Carlo database (MCDB) system use a variable generation (VG) function to generate a plurality of database instances from a possible-worlds database according to a plurality of Monte Carlo variable generation functions; and
- an analyzer configured to analyze the database instances from the possible-worlds database by executing a query on each database instance to generate a query-result distribution having an extreme quantile of interest;
- wherein the analyzer is further configured to:
  - select a cutoff value;
  - discard the database instances that yield query-result values below the cutoff value; and
  - retain the database instances that yield query-result values above the cutoff value as elite sets.

14. The system of claim 13, further comprising a cloner configured to replicate the elite sets.

15. The system of claim 14, further comprising a sampler configured to modify the elite sets so that each elite set is mutually statistically independent while still yielding query-result values above the cutoff value.

16. The system of claim 15, wherein the sampler is further configured to:
- select an element from one of the elite sets;
- generate a trial element to replace the element;
- analyze the elite set to determine if the query-result value is greater than the cutoff value; and
- replace the element with the trial element if the query-result value is greater than the cutoff value.

17. The system of claim 13, further comprising a rare event generator configured to update the cutoff value after each iteration of analyzing and discarding until a desired quantile portion is reached.

18. The system of claim 17, wherein all intermediate tail probabilities are equal and all intermediate sample sizes are equal.

* * * * *